(12) United States Patent
Takahashi et al.

(10) Patent No.: US 12,434,964 B2
(45) Date of Patent: Oct. 7, 2025

(54) HYDROGEN PRODUCTION APPARATUS

(71) Applicant: Hitachi, Ltd., Tokyo (JP)

(72) Inventors: Hiromasa Takahashi, Tokyo (JP); Shin Yabuuchi, Tokyo (JP); Naoto Fukatani, Tokyo (JP); Futoshi Furuta, Tokyo (JP); Jun Hayakawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 796 days.

(21) Appl. No.: 17/682,046

(22) Filed: Feb. 28, 2022

(65) Prior Publication Data
US 2023/0094287 A1    Mar. 30, 2023

(30) Foreign Application Priority Data
Sep. 30, 2021    (JP) .................................. 2021-161361

(51) Int. Cl.
| | | |
|---|---|---|
| *C01B 3/08* | (2006.01) | |
| *B01J 19/12* | (2006.01) | |
| *B01J 35/39* | (2024.01) | |
| *C01B 3/04* | (2006.01) | |
| *C01B 3/50* | (2006.01) | |
| *C25B 1/04* | (2021.01) | |

(Continued)

(52) U.S. Cl.
CPC ................ *C01B 3/08* (2013.01); *B01J 19/127* (2013.01); *B01J 35/39* (2024.01); *C01B 3/042* (2013.01); *C01B 3/50* (2013.01); *C25B 1/04* (2013.01); *C25B 1/55* (2021.01); *C25B 9/23* (2021.01); *C25B 15/083* (2021.01); *C01B 2203/0277* (2013.01); *C01B 2203/04* (2013.01)

(58) Field of Classification Search
CPC .... C25B 1/04; C25B 1/55; B01J 35/02; B01J 19/127; C01B 3/04; C01B 3/042; C01B 3/045
See application file for complete search history.

(56) References Cited

U.S. PATENT DOCUMENTS

| | | | | |
|---|---|---|---|---|
| 2006/0196777 A1* | 9/2006 | Bockris | ..................... | C25B 1/55 205/638 |
| 2008/0289951 A1* | 11/2008 | Huang | .................... | C01B 3/042 204/157.52 |

(Continued)

FOREIGN PATENT DOCUMENTS

| | | |
|---|---|---|
| JP | 58-183940 A | 10/1983 |
| JP | 6-233929 A | 8/1994 |

(Continued)

OTHER PUBLICATIONS

English Translation of WO-2020206883-A1 (Year: 2020).*

(Continued)

*Primary Examiner* — Brian W Cohen
*Assistant Examiner* — David Morgan Wirth
(74) *Attorney, Agent, or Firm* — Mattingly & Malur, PC

(57) ABSTRACT

A hydrogen production apparatus including a photocatalyst and generating hydrogen from water includes a wavelength separation unit separating sunlight by wavelength, an infrared light conversion unit converting infrared light separated by the wavelength separation unit to visible light, and an ultraviolet light conversion unit converting ultraviolet light separated by the wavelength separation unit to visible light.

14 Claims, 14 Drawing Sheets

(51) Int. Cl.
*C25B 1/55* (2021.01)
*C25B 9/23* (2021.01)
*C25B 15/08* (2006.01)

(56) References Cited

U.S. PATENT DOCUMENTS

| | | |
|---|---|---|
| 2009/0188783 A1 | 7/2009 | Yamada et al. |
| 2009/0321244 A1 | 12/2009 | Smith et al. |
| 2013/0168228 A1* | 7/2013 | Ozin .................. B01J 37/0215 977/773 |
| 2014/0301904 A1 | 10/2014 | Landry et al. |
| 2018/0243727 A1 | 8/2018 | Khan et al. |
| 2022/0024759 A1 | 1/2022 | Guo et al. |

FOREIGN PATENT DOCUMENTS

| | | | |
|---|---|---|---|
| JP | 2006-264992 A | 10/2006 | |
| JP | 2013-180245 A | 9/2013 | |
| WO | WO-2010107720 A2 * | 9/2010 | ............... A61L 2/08 |
| WO | WO-2020206883 A1 * | 10/2020 | ............ B01J 19/123 |

OTHER PUBLICATIONS

Extended European Search Report received in corresponding European Application No. 22159976.4 dated Aug. 23, 2022.
Japanese Office Action received in corresponding Japanese Application No. 2021-161361 dated Mar. 25, 2025.

\* cited by examiner

HYDROGEN PRODUCTION APPARATUS

CLAIM OF PRIORITY

The present application claims priority from Japanese Patent Application JP 2021-161361 filed on Sep. 30, 2021, the content of which is hereby incorporated by reference into this application.

BACKGROUND OF THE INVENTION

The present invention relates to a hydrogen production apparatus decomposing water with light and producing a hydrogen gas.

With respect to the technology of decomposing water with the sunlight and producing hydrogen highly efficiently represented by a photocatalyst, it is desired to be applied as a renewable energy business and an environment business addressed to achievement of the ecosocialism infrastructure such as the hydrogen power generation and the hydrogen-fueled car achieving non-fossil fuel as a production technology for an inexpensive accumulable energy carrier not involving emission of $CO_2$.

Also, when a highly efficiently utilizing technology for the sunlight is developed, since it can be applied to production of useful material and so on by applying a photocatalyst decomposing a chemical substance having a large environmental effect, it is also expected that the technology is spread to surrounding industries such as a substance generation system.

As a technology related to decomposing of water by the sunlight to generate hydrogen, in Japanese Unexamined Patent Application Publication No. 2013-180245, a description is given of a joint type Z-scheme catalyst having a high activity with respect to a complete decomposition reaction for water and a production method for hydrogen utilizing such catalyst.

SUMMARY OF THE INVENTION

As a highly efficiently utilizing technology for the sunlight energy required in decomposing water by the sunlight and generating hydrogen, there has been in progress the development of a material having an active region in a visible light region (400 to 700 nm) with a higher light intensity of the sunlight spectrum instead of a material of a prior art ($NaTaO_3$: 280 nm, $TiO_2$: around 400 nm) becoming active in an ultraviolet light region with respect to the frequency region of the irradiation light where the photocatalyst reaction becomes active.

However, the spectrum of the sunlight is spread largely not only to the ultraviolet light but also to the infrared light, and such energy has not been utilized. Also, since the energy of the infrared light of 1,000 nm or above is less than 1.23 V that is required for decomposition of water, it cannot be utilized for decomposition of water as it is. Thus, in a hydrogen production apparatus including a photocatalyst, it has not been possible to improve the light utilization efficiency.

Even in Japanese Unexamined Patent Application Publication No. 2013-180245, there is no description on effective utilization of light of a wide wavelength region from the ultraviolet light to the infrared light of the sunlight.

The present invention is to provide a hydrogen production apparatus solving the problem of the prior art described above, highly efficiently utilizing wavelength components of a wide range from the ultraviolet light to the infrared light of the sunlight including the visible light, and improving the total light utilization efficiency compared to a prior art.

In order to solve the problem described above, in the present invention, a hydrogen production apparatus including a photocatalyst and generating hydrogen from water is configured to include a wavelength separation unit separating sunlight by wavelength, an infrared light conversion unit converting infrared light separated by the wavelength separation unit to visible light, and an ultraviolet light conversion unit converting ultraviolet light separated by the wavelength separation unit to visible light.

Also, in order to solve the problem described above, in the present invention, a hydrogen production apparatus is configured to include a photocatalyst generating a hydrogen gas from water by irradiating light, a pipe allowing water to flow through the inside, a wavelength separation unit separating sunlight by wavelength, a first optical system condensing on the photocatalyst and irradiating visible light obtained by separating sunlight by wavelength using the wavelength separation unit, a second optical system converting ultraviolet light obtained by separating sunlight by wavelength using the wavelength separation unit to visible light and condensing on and irradiating the visible light to the photocatalyst, and a third optical system converting infrared light obtained by separating sunlight by wavelength using the wavelength separation unit to visible light and condensing on and irradiating the visible light to the photocatalyst.

Also, in order to solve the problem described above, in the present invention, a hydrogen production apparatus is configured to include a photocatalyst generating a hydrogen gas in water by irradiating visible light, a light irradiation unit irradiating visible light included in sunlight and visible light generated from light other than the visible light of the sunlight to the photocatalyst, and a water/gas separation mechanism unit separating a hydrogen gas from water, the hydrogen gas being generated by the photocatalyst, the visible light included in the sunlight and the generated visible light being irradiated to the photocatalyst from the light irradiation unit.

According to the present invention, it is possible to provide a hydrogen production apparatus highly efficiently utilizing wavelength components of a wide range from the ultraviolet light to the infrared light of the sunlight including the visible light and improving the total light utilization efficiency compared to a prior art.

DETAILED DESCRIPTION OF THE PREFERRED EMBODIMENTS

The present invention relates to a hydrogen production apparatus capable of efficiently separating and refining hydrogen from water by employing a configuration of solving a problem in combining an optical system and various functions with each other, the optical system efficiently converting the wavelength spectrum of the sunlight to an active region of the photocatalyst and condensing on the photocatalyst.

That is to say, according to the present invention, a hydrogen production apparatus is enabled to efficiently separate and refine hydrogen from water by using a photocatalyst ($TiO_2$, $LaTiO_2$, $TaON$, $Y_2Ti_2O_5S_2$, Rh-doped $SrTiO_3$, $ZnRh_2O_4$, $Sm_2Ti_2O_2S_5$, $CuAgZnSnS_4$, and so on for example) having an active region in the visible light region (wavelength: 400 nm to 700 nm) where the energy level of the sunlight comes to a peak, and respectively converting the wavelength of light having a wavelength component of the ultraviolet light region and light having a wavelength component of the infrared light region out of the sunlight to light having a wavelength of the visible light region to irradiate to the photocatalyst along with the visible light from the sunlight.

Embodiments of the present invention will be hereinafter explained in detail based on the drawings. In all drawings for explaining the present embodiment, those having a same function will be marked with a same reference sign, and repeated explanation thereof will be omitted in principle.

However, the present invention is not to be interpreted to be limited to the description content of the embodiments hereinafter shown. A person with an ordinary skill in the art is to easily understand that the concrete configuration of the present invention can be altered within a range not departing from the thought or the gist of the present invention.

First Embodiment

Figure 1:
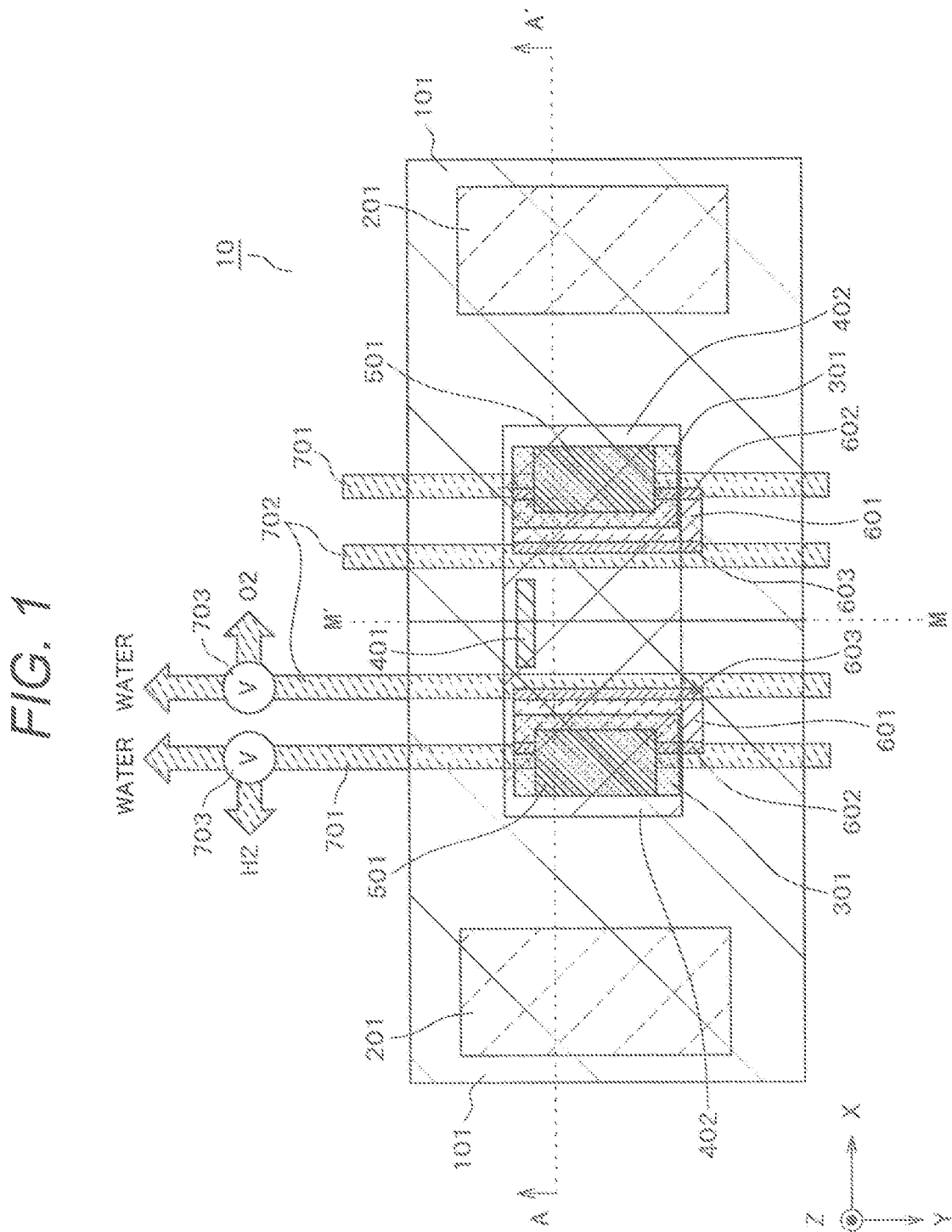
FIG. 1 is a plan view of a hydrogen production apparatus related to a first embodiment of the present invention.

A hydrogen production apparatus related to a first embodiment of the present invention will be explained using FIG. 1 to FIG. 4. FIG. 1 shows a plan view related to an overall configuration of a hydrogen production apparatus 10 related to the first embodiment, and FIG. 2 shows a cross-sectional view as seen along the line A-A' of FIG. 1.

Figure 2:
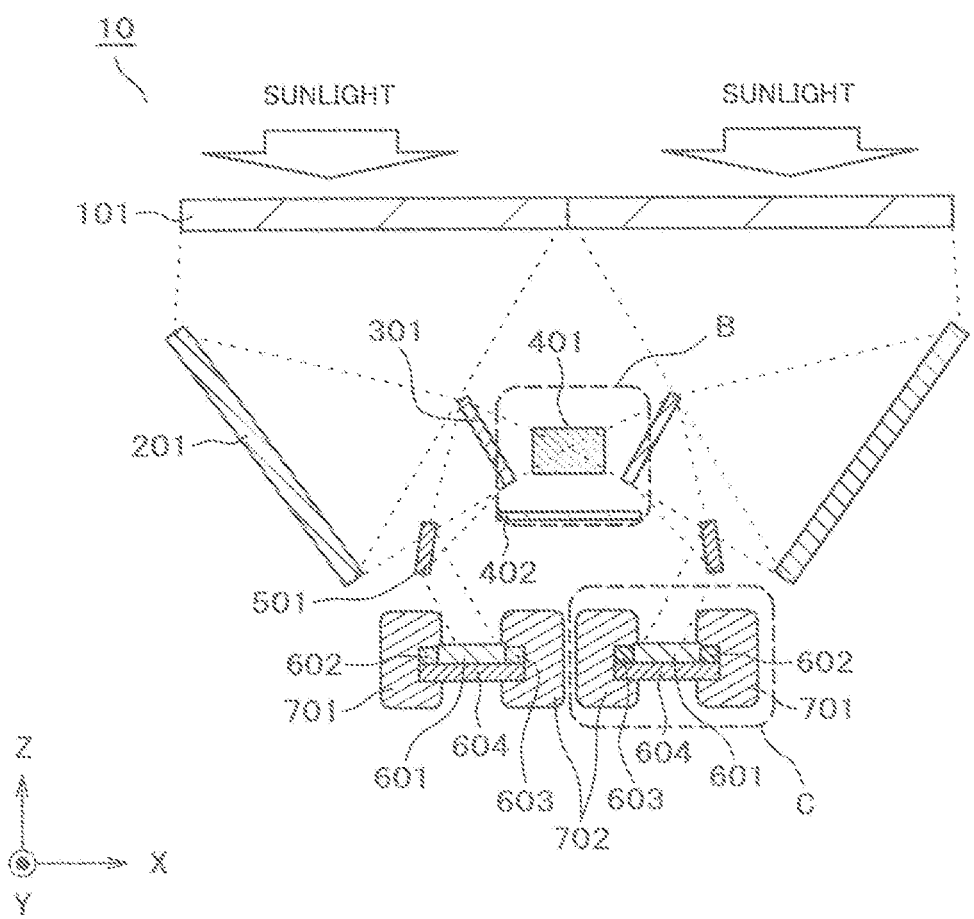
FIG. 2 is a cross-sectional view as seen along the line A-A' of FIG. 1.

In the configuration shown in FIG. 1 and FIG. 2, 101 is a lens A, 201 is a reflecting mirror, 301 is a wavelength separation filter, 401 is an infrared light conversion unit, 402 is a lens B, 501 is an ultraviolet light conversion unit, 601 is a photocatalyst, 602 is an auxiliary catalyst (for hydrogen), 603 is an auxiliary catalyst (for oxygen), 604 is a substrate, 701 is a pipe on the hydrogen gas generation side, 702 is a pipe on the oxygen gas generation side, and 703 is a water/gas separation mechanism unit separating water from a hydrogen gas or an oxygen gas.

The hydrogen production apparatus 10 related to the present embodiment has a configuration symmetric in the left and right portions with respect to the center line M-M' shown in FIG. 1. Although explanation will be given mainly with respect to a configuration on the left side of FIG. 1 and FIG. 2 in the explanation hereinafter, the same will be applicable with respect to a configuration on the right side.

In the configuration shown in FIG. 1 and FIG. 2, the lens A: 101 is a quartz Fresnel lens having a wide wavelength transmittivity. However, the lens A: 101 is not limited to the quartz Fresnel lens, and may be configured by a convex lens or a lens having a nonlinear curved surface, and so on. The sunlight having entered the lens A: 101 is condensed on the surface of the reflecting mirror 201 that has a smaller surface area than the lens A: 101 and is disposed to incline with respect to the lens A: 101.

The reflecting mirror 201 is a concave mirror or a reflecting mirror, the reflecting mirror 21 being formed by a nonlinear curved surface, reflects the sunlight condensed by the lens A: 101, and condenses the same on the surface of the wavelength separation filter 301. The wavelength separation filter 301 allows the infrared light to transmit therethrough, and reflects the visible light and the ultraviolet light having a shorter wavelength than the infrared light.

The infrared light having transmitted the wavelength separation filter 301 enters the infrared light conversion unit 401. The infrared light conversion unit 401 is formed by a configuration of forming a material emitting the visible light having a shorter wavelength than the infrared light when the infrared light enters (for example, the surface of a photonic crystalline body obtained by parallel arrangement of a number of quadrangular nanopillars with approximately 200 nm length of one side and approximately 500 nm height formed of Si and the like on a plane at 400 nm interval, the surface of one obtained by spreading circular nanoholes with approximately 500 nm diameter in a similar manner or a photonic crystalline body having a structure capable of changing the property of the semiconductor by applying voltage to the circular nanoholes and adjusting the wavelength of the reflected light, or a fluorescent agent emitting visible light by irradiation of the infrared light (light upconversion material), and so on) on the substrate. That is to say, by entering of the infrared light, visible light is generated from the infrared light conversion unit 401.

Also, in the infrared light conversion unit 401, when it is required to heat the infrared light conversion unit 401 in order to generate the visible light from the infrared light having entered, the infrared light conversion unit 401 can be configured to include a heating unit inside it.

Figure 3:
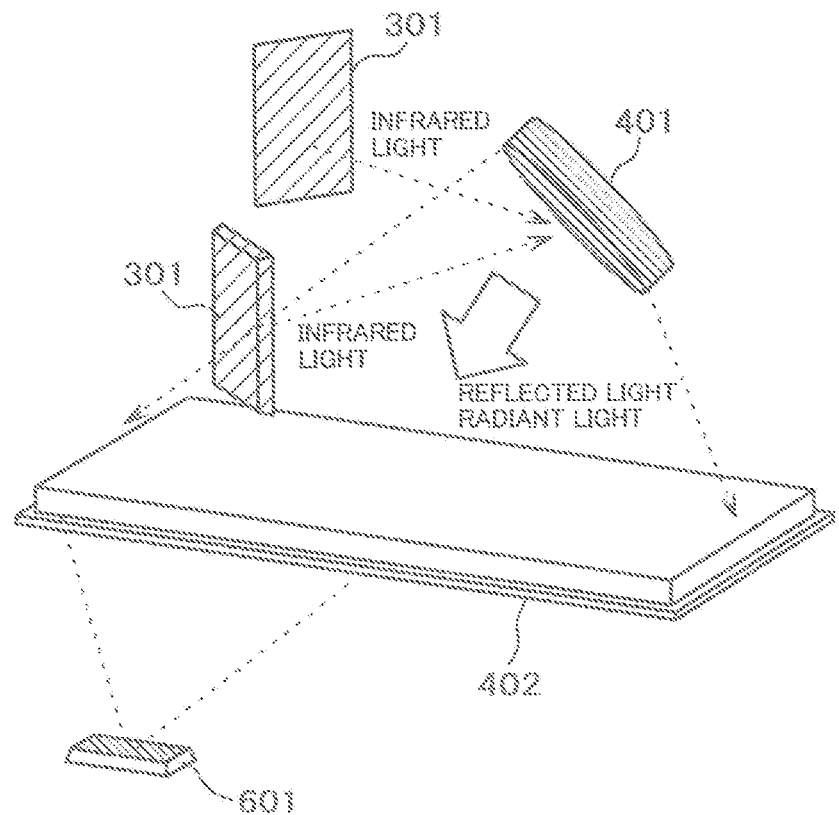
FIG. 3 is a perspective view enlarging the section B of FIG. 2.

The visible light generated in the infrared light conversion unit 401 where the infrared light entered enters the lens B: 402. FIG. 3 shows an enlarged region surrounded by the dotted line B in FIG. 2. The infrared light having transmitted the wavelength separation filter 301 enters the infrared light conversion unit 401, and the visible light generated in the infrared light conversion unit 401 enters the lens B: 402, and is condensed on the surface of the photocatalyst 601 and the auxiliary catalyst (for hydrogen) 602 and the auxiliary catalyst (for oxygen) 603, the auxiliary catalyst (for hydrogen) 602 and the auxiliary catalyst (for oxygen) 603 being formed at both ends of the photocatalyst 601.

In order that the infrared light having transmitted the wavelength separation filter 301 enters more and that the visible light having been generated enters the lens B: 402 more, the infrared light conversion unit 401 is disposed to incline with respect to the wavelength separation filter 301 and the lens B: 402.

On the other hand, the visible light and the ultraviolet light having not transmitted the wavelength separation filter 301 out of the sunlight having entered the wavelength separation filter 301 are reflected by the wavelength separation filter 301 and enter the ultraviolet light conversion unit 501. In the ultraviolet light conversion unit 501, a fluorescent agent emitting a fluorescent light (visible light) when the ultraviolet light is irradiated is coated on the surface of the base material.

The visible light out of the visible light and the ultraviolet light having entered the ultraviolet light conversion unit 501 is reflected at the surface of the ultraviolet light conversion unit 501 with the optical path being converted, and is condensed by the ultraviolet light conversion unit 501 on the surface of the photocatalyst 601 and the auxiliary catalyst (for hydrogen) 602 and the auxiliary catalyst (for oxygen) 603, the auxiliary catalyst (for hydrogen) 602 and the auxiliary catalyst (for oxygen) 603 being formed on both ends of the photocatalyst 601. On the other hand, by that the ultraviolet light enters the ultraviolet light conversion unit 501, a fluorescent light (visible light) is generated from the fluorescent agent coated on the surface of the base material of the ultraviolet light conversion unit 501, and a part of the fluorescent light (visible light) is condensed on the surface of the photocatalyst 601 and the auxiliary catalyst (for hydrogen) 602 and the auxiliary catalyst (for oxygen) 603, the auxiliary catalyst (for hydrogen) 602 and the auxiliary catalyst (for oxygen) 603 being formed on both ends of the photocatalyst 601.

Figure 4:
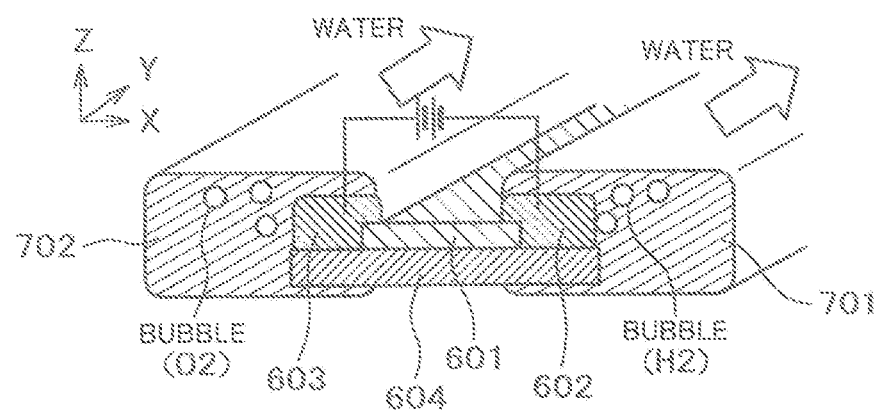
FIG. 4 is a perspective view enlarging the section C of FIG. 2.

FIG. 4 shows the detail of a portion including the photocatalyst 601 surrounded by the dotted line C in FIG. 2. The photocatalyst 601, the auxiliary catalyst (for hydrogen) 602 formed at one end of the photocatalyst 601, and the auxiliary catalyst (for oxygen) 603 formed at the other end of the photocatalyst 601 are formed on the substrate 604. The end of the photocatalyst 601 on a side where the auxiliary catalyst (for hydrogen) 602 is formed is placed inside the pipe 701 on the hydrogen gas generation side along with the substrate 604, water flowing through the inside of the pipe 701 on the hydrogen gas generation side. On the other hand, the end of the photocatalyst 601 on a side where the auxiliary catalyst (for oxygen) 603 is formed is placed inside of the pipe 702 on the oxygen gas generation side along with the substrate 604, water flowing through the inside of the pipe 702 on the oxygen gas generation side. In this state, between the auxiliary catalyst (for hydrogen) 602 and the auxiliary catalyst (for oxygen) 603, an electric potential difference is generated.

Gaps between the photocatalyst 601 and the substrate 604 and the pipe 701 on the hydrogen gas generation side and the pipe 702 on the oxygen gas generation side are sealed by seal members not illustrated in order that water flowing through the inside of the pipe 701 on the hydrogen gas generation side or the pipe 702 on the oxygen gas generation side does not leak to the outside.

Material of the auxiliary catalyst is determined by combination with the photocatalyst. For example, with respect to $SrTiO_3$ having been doped, $IrO_3$, $BiVO_4$, $CoO$, $CoOOH$, and the like are used on the cathode pole side generating oxygen, and the photocatalyst material itself may be used on the anode side generating hydrogen. Also, with respect to $WO_3$, $PO_3$ is used on the cathode side, and $WO_3$ is used on the anode side. Also, with respect to TaON, NiO is used on the cathode side, and $WO_3$-supported TaON is used on the anode side. With respect to LaTiON, $LaTiO_2$ is used on the cathode side, and Pt-supported $LaTiO_2$ is used on the anode side. With respect to $Y_2Ti_2O_2S_5$, $IrO_2$ is used on the cathode side, and Rh or Rh coated with $Cr_2O_3$ is used on the anode side. Above are examples and appropriate combinations other than the above are to be selected and used.

In the configuration shown in FIG. 4, the visible light converted from the infrared light and condensed by the lens B: 402 out of the sunlight having entered the lens A: 101 and the visible light converted from the ultraviolet light by the ultraviolet light conversion unit 501 and the visible light reflected by the ultraviolet light conversion unit 501 out of the sunlight having entered the lens A: 101 enter the photocatalyst 601 and the auxiliary catalyst (for hydrogen) 602 and the auxiliary catalyst (for oxygen) 603 which are irradiated by these visible lights, the auxiliary catalyst (for hydrogen) 602 and the auxiliary catalyst (for oxygen) 603 being formed at both ends of the photocatalyst 601.

In the photocatalyst 601 and the auxiliary catalyst (for hydrogen) 602 and the auxiliary catalyst (for oxygen) 603 where these visible lights have entered, the auxiliary catalyst (for hydrogen) 602 and the auxiliary catalyst (for oxygen) 603 being formed at both ends of the photocatalyst 601, water is decomposed and a hydrogen gas is generated in the inside of the pipe 701 on the hydrogen gas generation side, and water is decomposed and an oxygen gas is generated in the inside of the pipe 702 on the oxygen gas generation side.

The hydrogen gas generated inside of the pipe 701 on the hydrogen gas generation side flows along with the water, the hydrogen gas is separated from the water in the water/gas separation mechanism unit 703, and the hydrogen gas is recovered. On the other hand, the oxygen gas generated inside of the pipe 702 on the oxygen gas generation side flows along with water, the oxygen gas is separated from the water in the water/gas separation mechanism unit 703, and the oxygen gas is recovered.

Although the potential on the hydrogen generation electrode side is approximately zero, according to the kind of the catalyst, there is a case where the reaction becomes extremely slow or stops when the potential on the hydrogen generation electrode side is lower than the potential of water. Therefore, the present embodiment is to include a case of arranging a mechanism applying a weak external voltage less than 0.5 V. Further, the present embodiment is to include also a case water is made an electrolyte solution by an additive in order to promote the reaction.

According to the present embodiment, the utilization efficiency of the sunlight in the hydrogen production apparatus 10 could be improved by converting to the visible light and using respective components of the infrared light and the ultraviolet light not capable of activating the photocatalyst as it is and not contributing to generation of the hydrogen gas out of the sunlight entering the hydrogen production apparatus 10.

Second Embodiment

A second embodiment of the present invention will be explained using FIG. 5 and FIG. 6.

Figure 5:
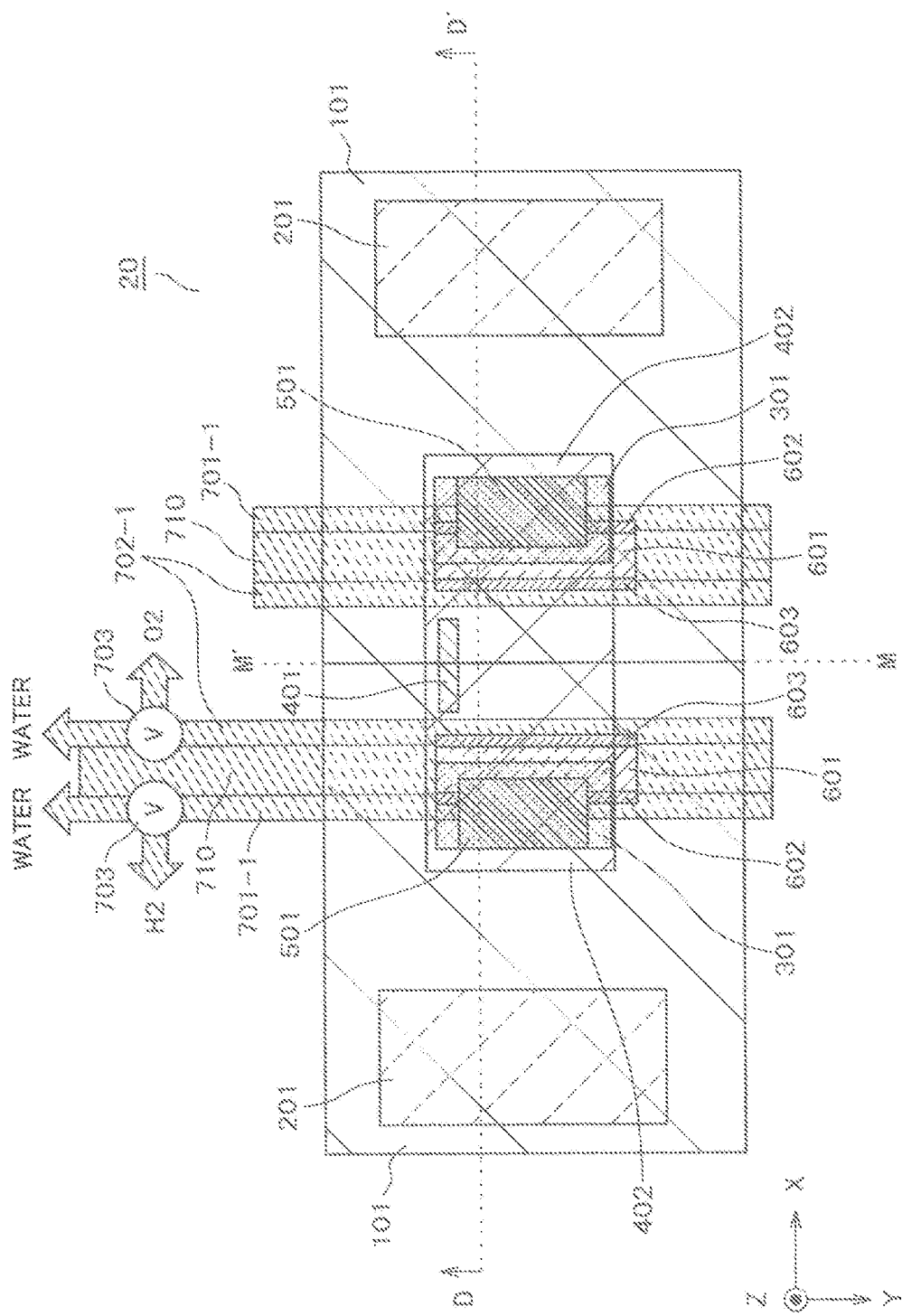
FIG. 5 is a plan view of a hydrogen production apparatus related to a second embodiment of the present invention.

FIG. 5 is a plan view showing an overall configuration of a hydrogen production apparatus 20 related to the second embodiment. Of the configuration of the hydrogen production apparatus 20 related to the present embodiment, since the configuration of the optical system irradiating the sunlight having entered the lens A: 101 to the photocatalyst 601 through the lens B: 402 and the configuration of the optical system irradiating the sunlight having entered the lens A:

101 to the photocatalyst 601 through the ultraviolet light conversion unit 501 are same with the configuration of the hydrogen production apparatus 10 explained in the first embodiment, explanation thereof will be omitted.

In the present embodiment, the configuration of a portion including the photocatalyst 601 corresponding to the portion surrounded by the dotted line C of FIG. 2 in the first embodiment is different from the first embodiment. The detail of the portion including the photocatalyst 601 corresponding to the portion surrounded by the dotted line C of FIG. 2 in the cross section D-D' of FIG. 5 and related to the present embodiment will be shown in the perspective view of FIG. 6.

In the first embodiment, the pipe 701 on the hydrogen gas generation side and the pipe 702 on the oxygen gas generation side on both sides of the photocatalyst 601 are disposed to be apart from each other. On the other hand, the present embodiment is configured such that a pipe 701-1 on the hydrogen gas generation side and a pipe 702-1 on the oxygen gas generation side are connected to each other by an intermediate section 710 and the entirety of the photocatalyst 601 is placed in water.

With such configuration, water flowing through the pipe 701-1 on the hydrogen gas generation side and water flowing through the pipe 702-1 on the oxygen gas generation side come to be mixed with each other. However, according to the present embodiment, by setting the gap between the intermediate section 710 and the photocatalyst 601 therebeneath to be narrow, the mixed volume of the water flowing through each pipe is reduced. Thus, the amount of the oxygen gas flowing in to the side of the pipe 701-1 on the hydrogen gas generation side and the amount of the hydrogen gas flowing in to the side of the water flowing through the pipe 702-1 on the oxygen gas generation side can be reduced, and reduction in yield of the hydrogen gas and the oxygen gas separated by the water/gas separation mechanism unit 703 can be made small to an ignorable degree.

Since the present embodiment is configured such that the entirety of the photocatalyst 601 is placed in water, the configuration can be simplified by dispensing with such configuration of preventing water leakage in the gaps between the photocatalyst 601 and the pipe 701 on the hydrogen gas generation side and the pipe 702 on the oxygen gas generation side as the configuration of the first embodiment.

Modification

Figure 6:
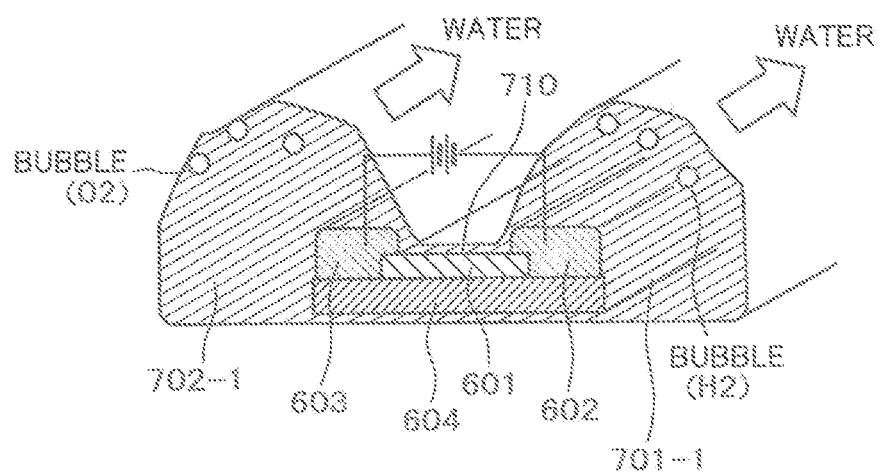
FIG. 6 is a perspective view equivalent to the detail of the section C of FIG. 4 of the first embodiment in the hydrogen production apparatus related to the second embodiment.
Figure 7:
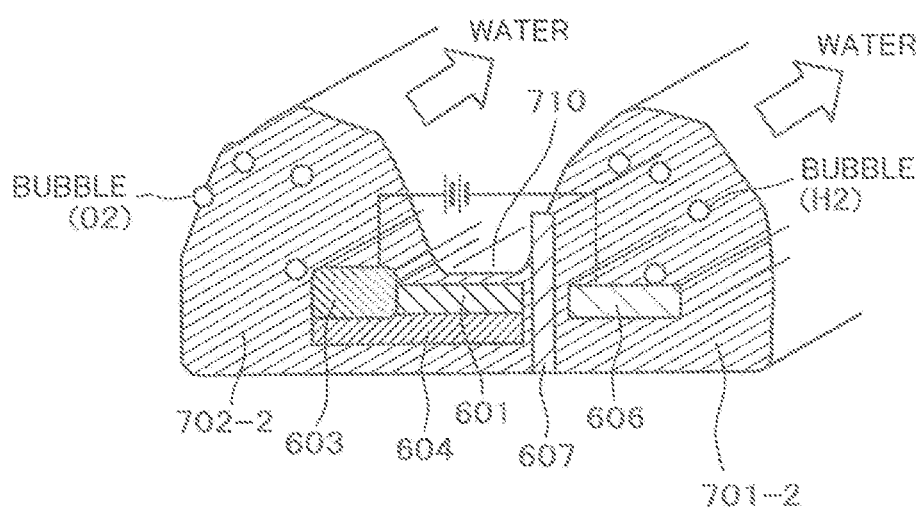
FIG. 7 is a perspective view corresponding to FIG. 6 in a modification of the second embodiment.

A modification of the second embodiment is shown in FIG. 7. Compared to the configuration shown in FIG. 6, with respect to the configuration shown in FIG. 7, although the configuration on the side of a pipe 702-2 on the oxygen gas generation side and the configuration of connecting a pipe 701-2 on the hydrogen gas generation side and the pipe 702-2 on the oxygen gas generation side to each other by the intermediate section 710 are same, the configuration of the inside of the pipe 701-2 on the hydrogen gas generation side is different.

That is to say, the present embodiment is configured such that, in the inside of the pipe 701-2 on the hydrogen gas generation side, the auxiliary catalyst (for hydrogen) 602 of FIG. 6 is eliminated, an opposite electrode 606 formed of Pt and the like is arranged instead of the auxiliary catalyst (for hydrogen) 602, and an ion-exchanging membrane 607 is disposed between the opposite electrode 606 and the photocatalyst 601 and the substrate 604.

The ion-exchanging membrane 607 has a property of allowing a counter-ion to transmit therethrough. By separating the pipe 701-2 on the hydrogen gas generation side and the pipe 702-2 on the oxygen gas generation side from each other by this ion-exchanging membrane 607, oxygen gas and hydrogen gas can be separately generated in the pipe 701-2 on the hydrogen gas generation side and the pipe 702-2 on the oxygen gas generation side.

According to the present modification, in addition to the effect explained in the second embodiment, since an auxiliary catalyst (the auxiliary catalyst (for oxygen) 603 in the example of FIG. 7) only has to be formed only on one end side of the photocatalyst 601 (on the side of the pipe 702-2 on the oxygen gas generation side in the configuration shown in FIG. 7), the working man-hour is reduced and the manufacturing method is simplified compared to such configuration of forming the photocatalysts respectively in both ends of the photocatalyst 601 as shown in FIG. 6.

Also, since the auxiliary catalyst combined with the photocatalyst 601 is reduced to one kind from two kinds of the case of FIG. 6, selection of the material of the photocatalyst 601 and the auxiliary catalyst becomes easy.

Third Embodiment

A third embodiment of the present invention will be explained using FIG. 8 to FIG. 11.

The first and second embodiments are configured such that the visible light and the ultraviolet light having been reflected by the wavelength separation filter 301 are allowed to enter the ultraviolet light conversion unit 501, the visible light is reflected, and the ultraviolet light is converted to a fluorescent light. On the other hand, the present embodiment is configured such that conversion of the wavelength of the ultraviolet light is not exerted, and a diffracted light according to the wavelength is generated using a wavelength separation plate.

Figure 8:
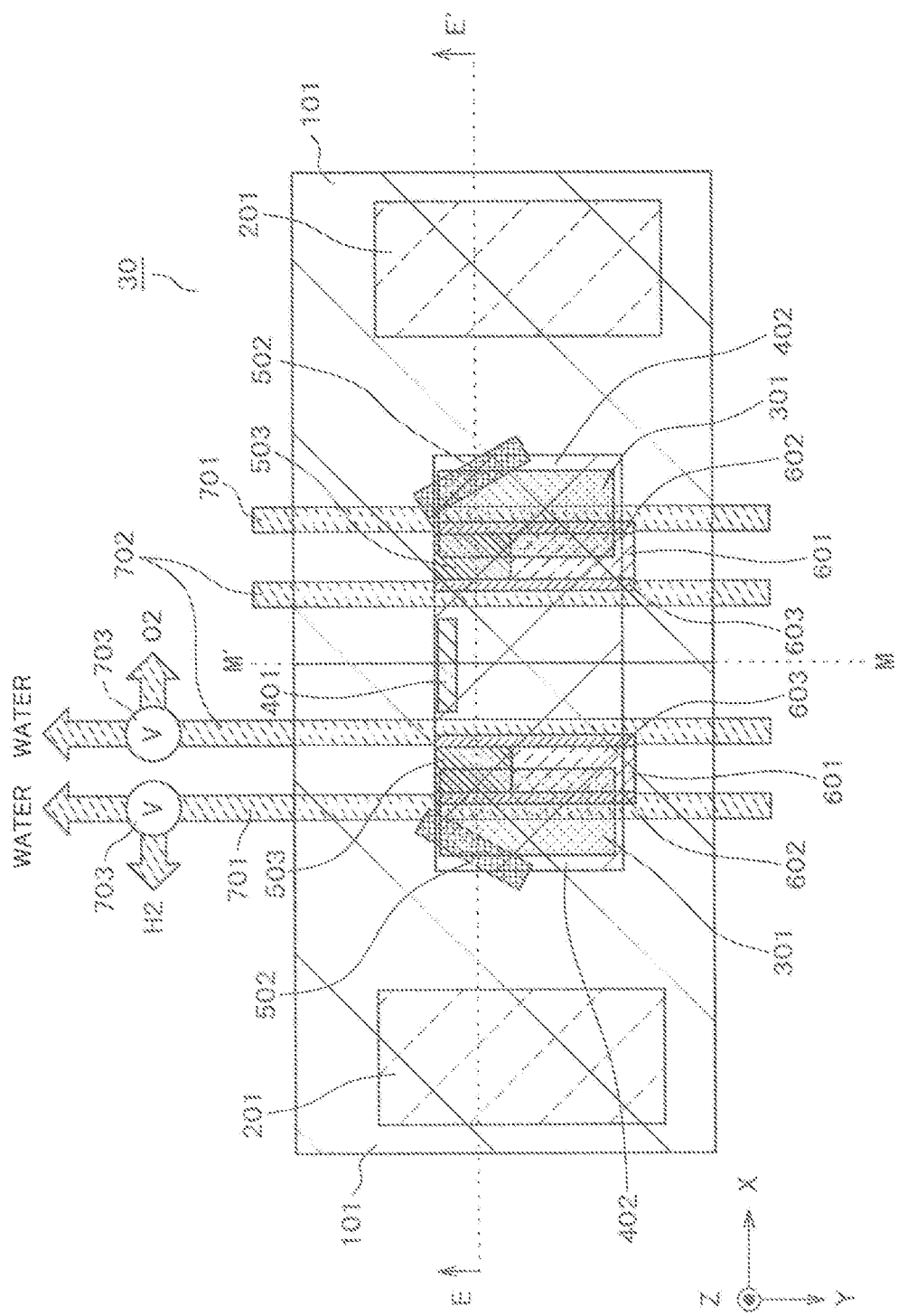
FIG. 8 is a plan view of a hydrogen production apparatus related to a third embodiment of the present invention.
Figure 9:
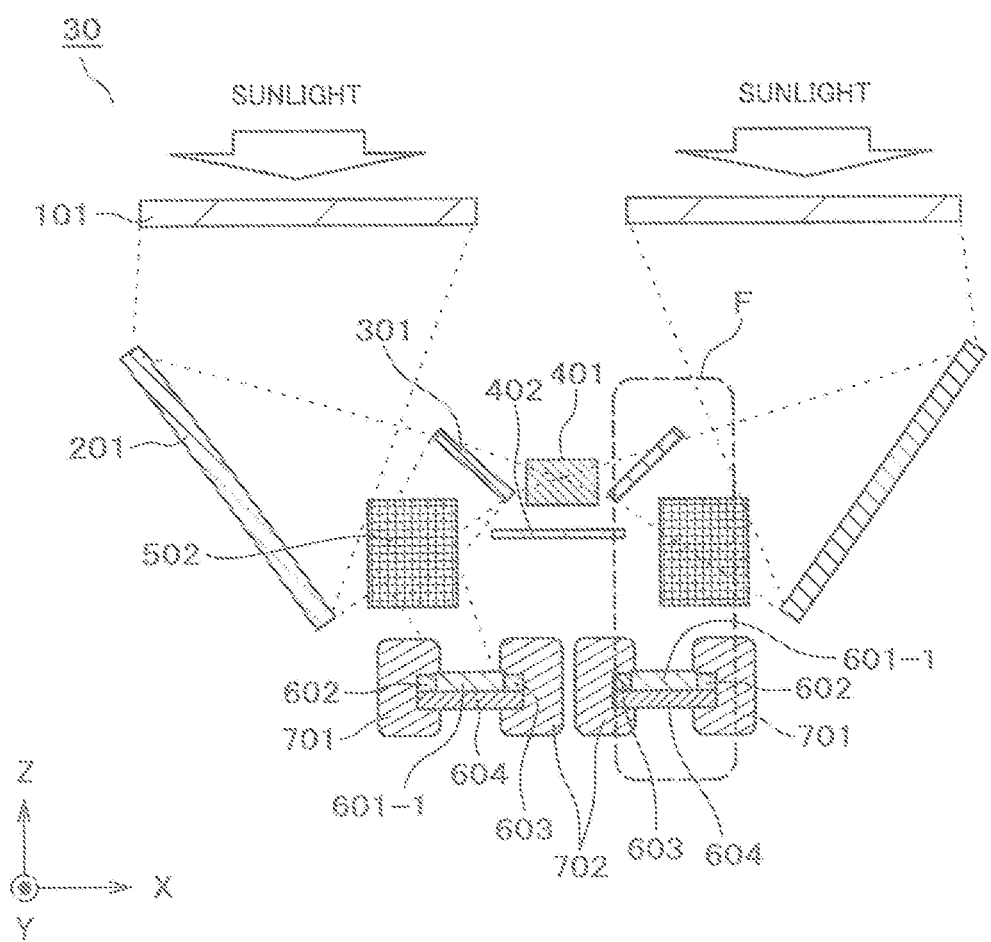
FIG. 9 is a cross-sectional view as seen along the line E-E' of FIG. 8.

FIG. 8 shows a plan view of a hydrogen production apparatus 30 related to the present embodiment, and FIG. 9 shows a cross-sectional view as seen along the line E-E' in FIG. 8.

The configuration of the hydrogen production apparatus 30 related to the present embodiment is different from the configuration explained in the first and second embodiments in terms of processing of the light having the wavelength region from the visible light to the ultraviolet light separated by the wavelength separation filter 301 out of the sunlight having entered the lens A: 101 and having been reflected by the reflecting mirror 201.

On the other hand, the configuration of the optical system that the visible light generated from the infrared light conversion unit 401 where the infrared light having transmitted the wavelength separation filter 301 out of the sunlight having entered the lens A: 101 and having been reflected by the reflecting mirror 201 entered is irradiated to the photocatalyst 601 through the lens B: 402 is same with the configuration of the hydrogen production apparatus 10 explained in the first embodiment, and therefore explanation thereof will be omitted.

In the configuration shown in FIG. 9, the light having been reflected by the wavelength separation filter 301 and having the wavelength region from the visible light to the ultraviolet light enters a wavelength separation unit (monochromater) 502 at a diffraction angle.

Figure 10:
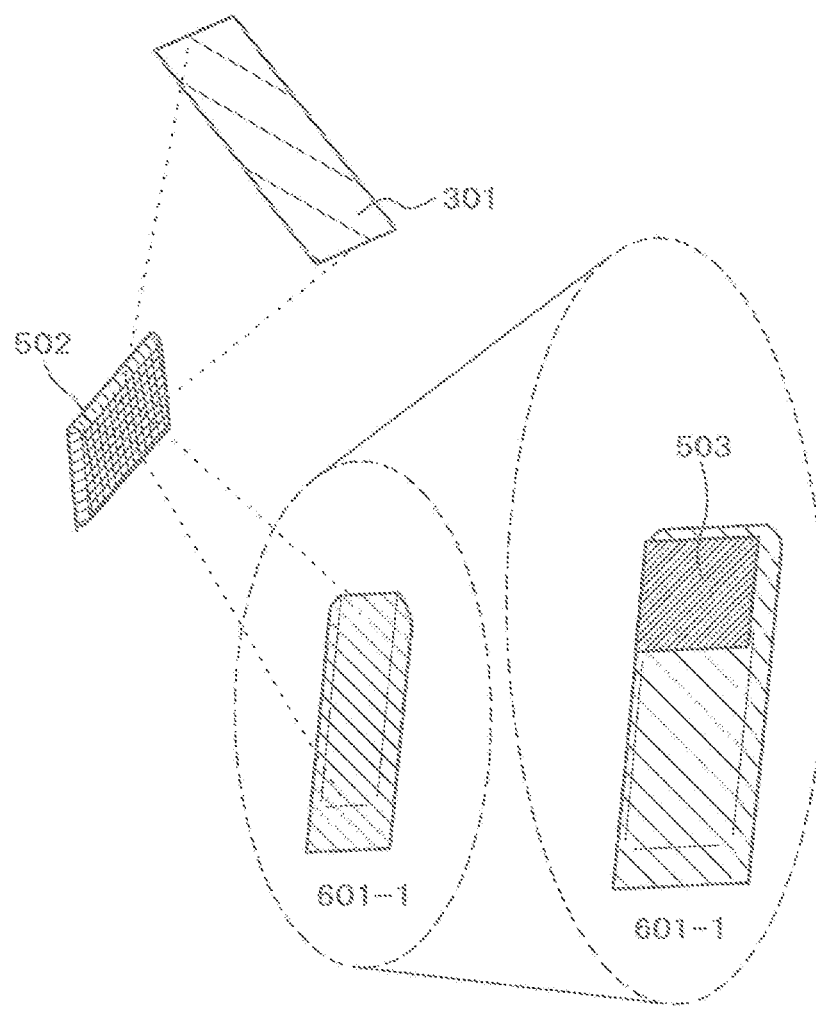
FIG. 10 is a perspective view enlarging the section F of FIG. 9.

FIG. 10 shows an enlarged view of a portion surrounded by the dotted line F in FIG. 9. The light having been reflected by the wavelength separation filter 301 and having the wavelength region from the visible light to the ultraviolet light enters the wavelength separation unit (monochromater) 502, is emitted from the wavelength separation unit (monochromater) 502 at a diffraction angle according to the wavelength, and enters the surface of a photocatalyst 601-1. Here, with respect to the wavelength separation unit (monochromater) 502, the angle between the wavelength separation filter 301 and the surface of the photocatalyst 601-1 is adjusted so that the diffracted light generated by the light having entered from the wavelength separation filter 301 advances in the direction of the surface of the photocatalyst 601-1.

With respect to the diffracted light generated in the wavelength separation unit (monochromater) 502, the emission angle from the wavelength separation unit (monochromater) 502 changes according to the wavelength, the light having a comparatively short wavelength (ultraviolet light) enters the upper side of the photocatalyst 601-1 in the example of FIG. 10, and the light having a comparatively long wavelength (visible light) enters the lower side of the photocatalyst 601-1.

Here, in a similar manner to the photocatalyst 601 explained in the first and second embodiments, the photocatalyst 601-1 is formed of material having sensitivity to the visible light. In a part of the photocatalyst 601-1, as enlargingly illustrated on the right side of FIG. 10, a wavelength conversion layer 503 configured of material converting the ultraviolet light to the visible light is formed at a portion on the upper side where the light having a comparatively short wavelength (ultraviolet light) enters. The ultraviolet light having entered the wavelength conversion layer 503 is converted to the visible light, and reaches the photocatalyst 601-1 below the wavelength conversion layer 503. On the other hand, the light having a comparatively long wavelength (visible light) enters a portion on the lower side and formed of material having sensitivity to the visible light.

Thus, by configuring the position for entering the photocatalyst 601-1 to be differentiated according to the wavelength and forming the wavelength conversion layer 503 at a portion where the ultraviolet light enters out of the surface of the photocatalyst 601-1, the ultraviolet light out of the sunlight having entered the lens A: 101 is irradiated to the photocatalyst 601-1 along with the visible light without converting the wavelength, and therefore reduction of the light quantity irradiated to the photocatalyst 601-1 out of the sunlight having entered the lens A: 101 can be suppressed.

Further, it is also possible to configure that a layer of an ultraviolet light-sensitive photocatalyst is formed instead of the wavelength conversion layer 503 at a portion of FIG. 10 where the wavelength conversion layer 503 is formed and the photocatalyst reaction is generated directly by the ultraviolet light having entered the portion in the relevant part.

First Modification

Explanation will be made on an example of substituting the wavelength conversion layer 503 of the photocatalyst 601-1 shown in FIG. 10 by a material having sensitivity to the ultraviolet light as a first modification of the third embodiment.

In the configuration of the photocatalyst 601-1 enlargingly shown on the right side of FIG. 10, by substituting the portion of the wavelength conversion layer 503 where the ultraviolet light enters by a photocatalyst formed of material having sensitivity to the ultraviolet light, the ultraviolet light having been diffracted by the wavelength separation unit (monochromater) 502 and having entered the portion on the upper side of the photocatalyst 601-1 can be detected as it is without converting the wavelength. On the other hand, the portion on the lower side where the light having a comparatively long wavelength (visible light) enters is formed of material having sensitivity to the visible light similarly to the photocatalyst 601 explained in the third embodiment.

Thus, by configuring the surface of the photocatalyst 601-1 with the material having sensitivity according to the wavelength of the entering light, the ultraviolet light out of the sunlight having entered the lens A: 101 is irradiated to the photocatalyst 601-1 along with the visible light without converting the wavelength, and therefore reduction of the light quantity irradiated to the photocatalyst 601-1 out of the sunlight having entered the lens A: 101 can be suppressed.

Second Modification

Figure 11:
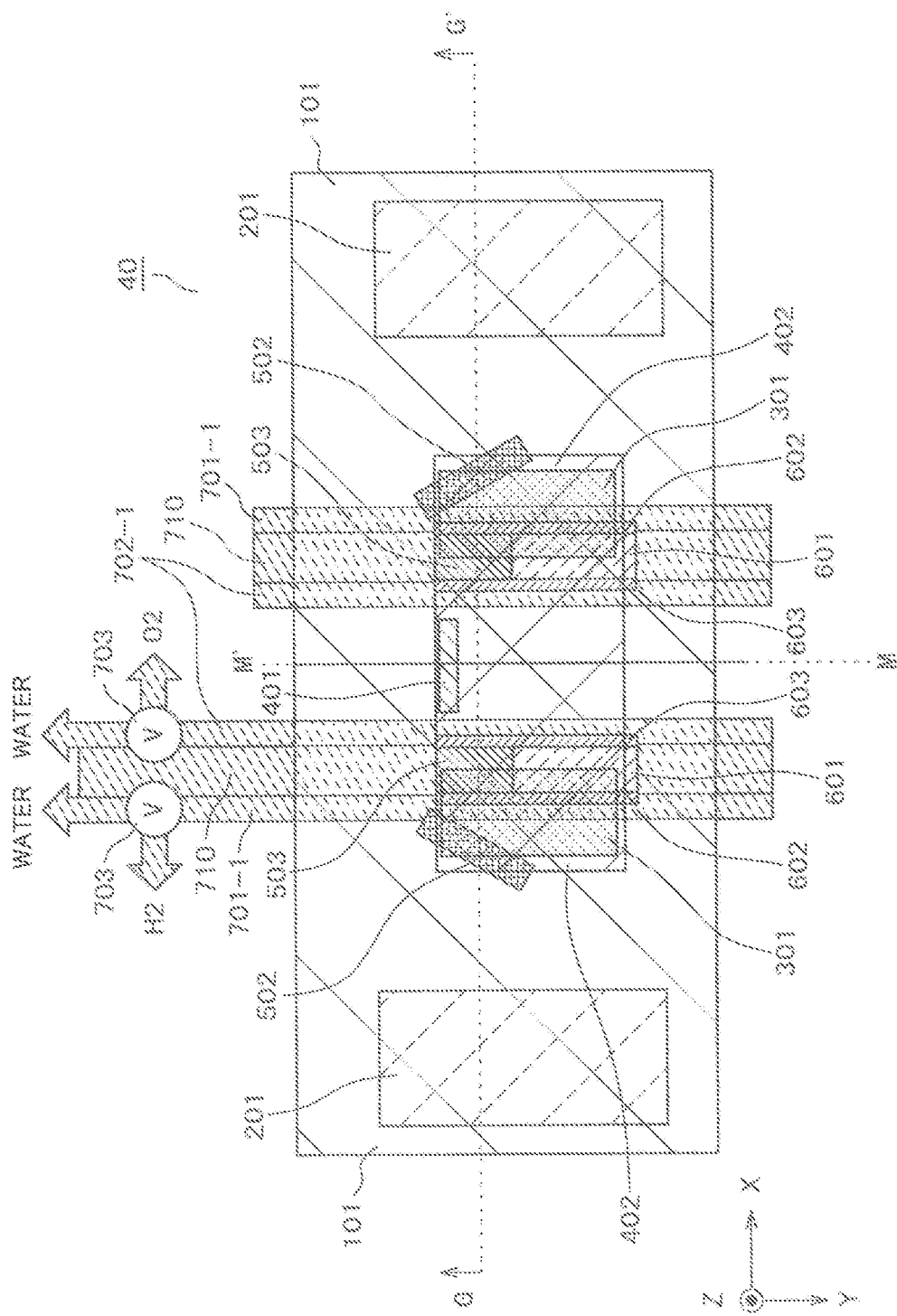
FIG. 11 is a plan view of a hydrogen production apparatus related to the second modification of the third embodiment.

FIG. 11 shows a plan view of a hydrogen production apparatus 40 related to the present modification as a second modification of the third embodiment.

With respect to the hydrogen production apparatus 40 related to the present modification, the configuration of the photocatalyst 601-1 and its surroundings in FIG. 9 of the third embodiment corresponding to G-G' cross section of FIG. 11 is made such that the pipe 701-1 on the hydrogen gas generation side and the pipe 702-1 on the oxygen gas generation side are connected to each other by the intermediate section 710 and the entirety of the photocatalyst 601-1 is placed in water similarly to those explained using FIG. 6 in the second embodiment.

Since the present modification is configured such that the entirety of the photocatalyst 601 is placed in water, the configuration can be simplified by a portion that such configuration of preventing water leakage in the gaps between the photocatalyst 601-1 and the pipe 701 on the hydrogen gas generation side and the pipe 702 on the oxygen gas generation side as the configuration of the third embodiment is not required.

Further, it is also possible to be configured as explained using FIG. 7 as a modification of the third embodiment.

By such configuration as shown in FIG. 7, the working man-hour is reduced and the manufacturing method is simplified compared to such configuration of forming the auxiliary catalysts 602 and 603 respectively in both ends of the photocatalyst 601-1 as shown in FIG. 9.

Also, since the auxiliary catalyst combined with the photocatalyst 601-1 is reduced to one kind as shown in FIG. 7 from two kinds of the case of FIG. 6, selection of the material of the photocatalyst 601-1 and the auxiliary catalyst becomes easy.

Fourth Embodiment

A fourth embodiment of the present invention will be explained using FIG. 12 to FIG. 14.

The present embodiment is different from the configuration explained in the first to third embodiments in that the visible light emitted from the infrared light conversion unit 401 is configured to be irradiated to the photocatalyst 601 using an optical fiber.

Figure 12:
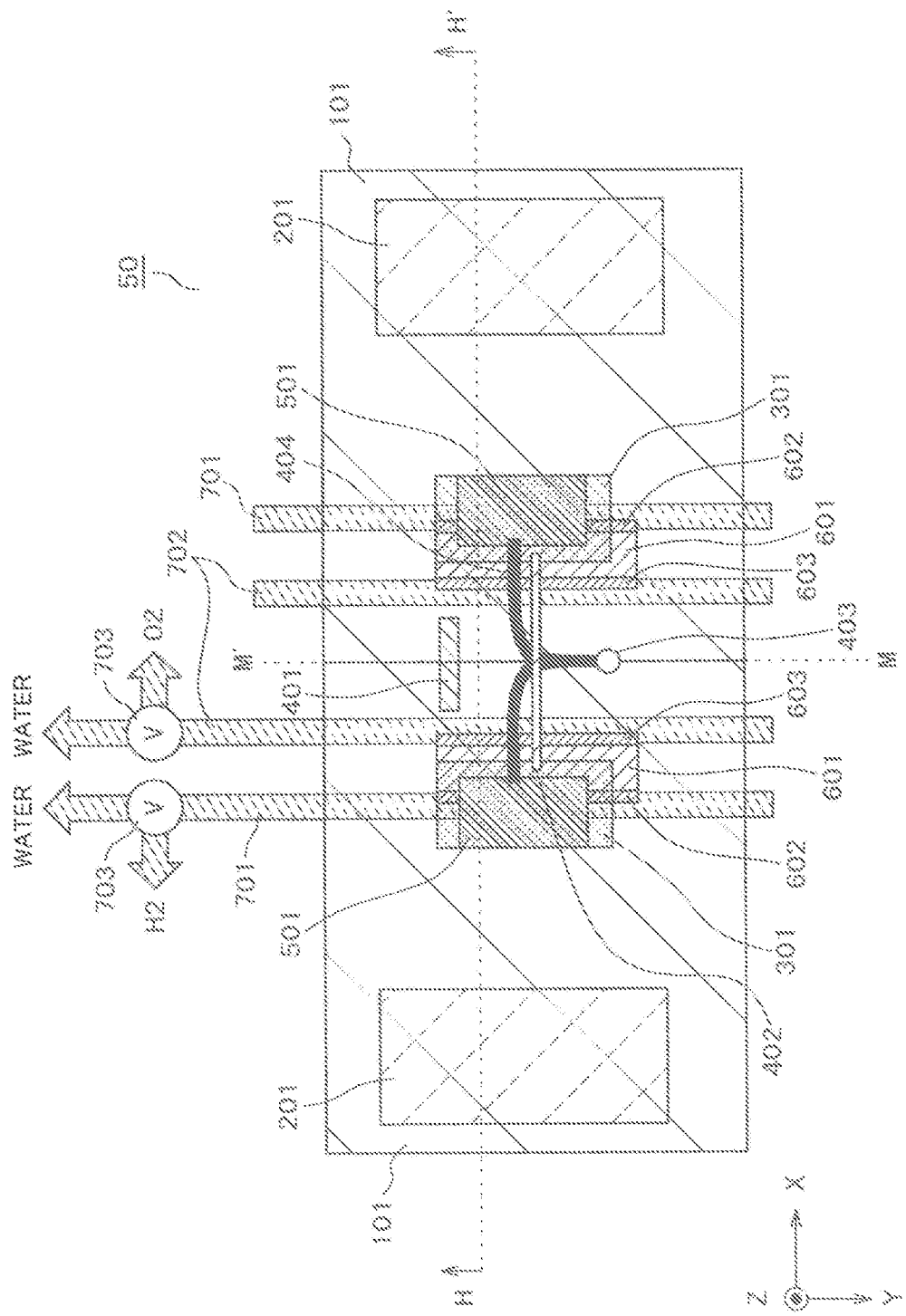
FIG. 12 is a plan view of a hydrogen production apparatus related to a fourth embodiment of the present invention.
Figure 13:
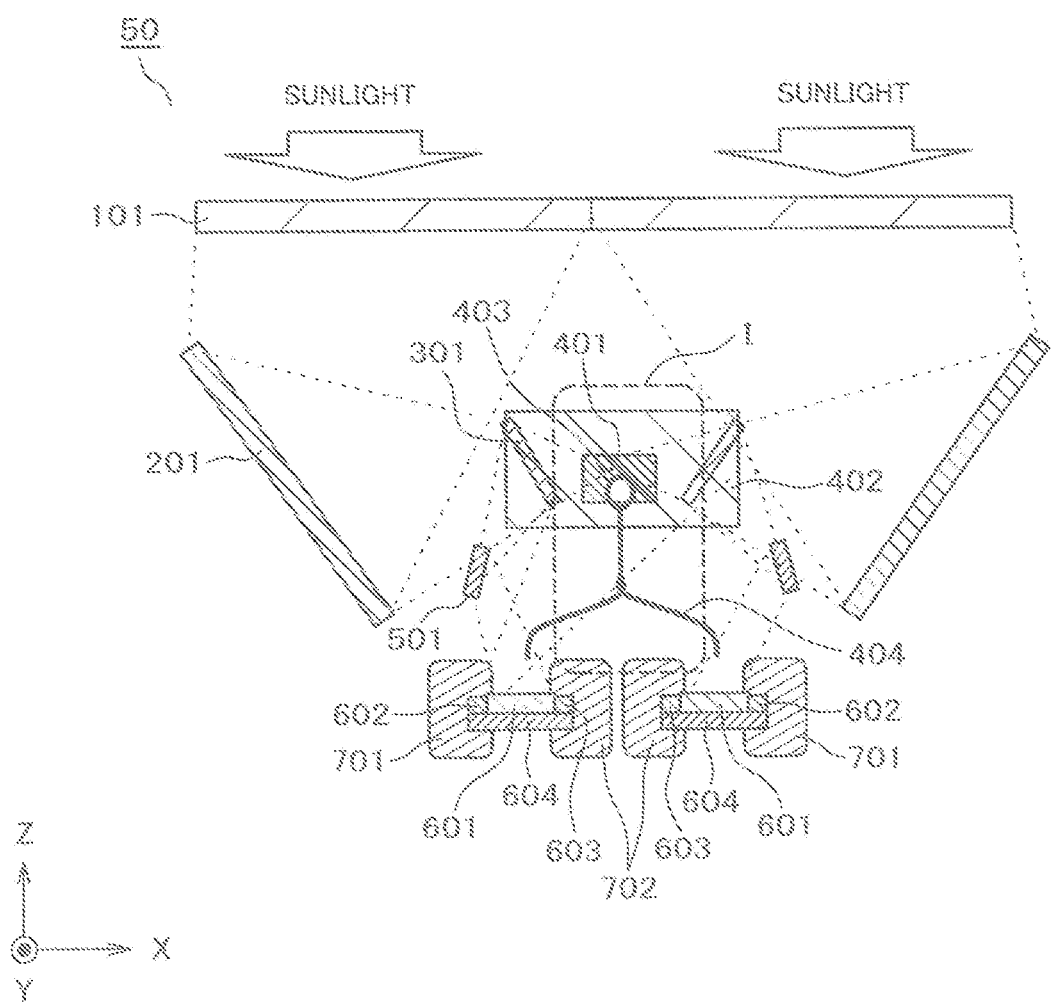
FIG. 13 is a cross-sectional view as seen along the line H-H' of FIG. 12.
Figure 14:
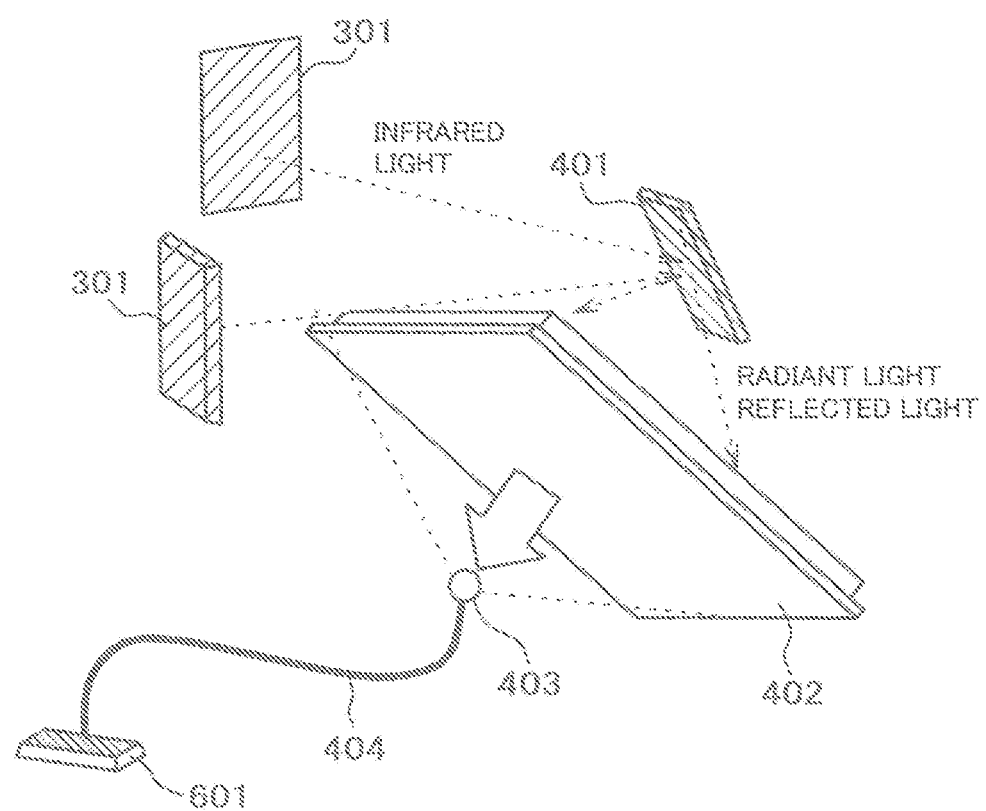
FIG. 14 is a perspective view enlarging the section I of FIG. 13.

FIG. 12 shows a plan view of a hydrogen production apparatus 50 related to the present embodiment, and FIG. 13 shows a cross-sectional view as seen along the line H-H' in FIG. 12.

In the configuration of the hydrogen production apparatus 50 shown in FIG. 12 and FIG. 13, the configuration of the optical system allowing the light having the wavelength range from the visible light to the ultraviolet light separated by the wavelength separation filter 301 out of the sunlight having entered the lens A: 101 and having been reflected by the reflecting mirror 201 to enter the ultraviolet light conversion unit 501 and irradiating the visible light emitted from the ultraviolet light conversion unit 501 to the photocatalyst 601 and the configuration of the optical system up to allowing the infrared light having transmitted the wavelength separation filter 301 out of the sunlight having entered the lens A: 101 and having been reflected by the reflecting mirror 201 to enter the lens B: 402 from the infrared light conversion unit 401 are same to the configuration of the hydrogen production apparatus 10 explained in the first embodiment, and therefore explanation thereof will be omitted.

As shown in FIG. 12, the hydrogen production apparatus 50 related to the present embodiment is different from the configuration of the first to third embodiments in terms of the positional relation of the lens B: 402 with respect to the infrared light conversion unit 401, and a tip portion 403 of an optical fiber 404 is disposed on the opposite side of the infrared light conversion unit 401 across the lens B: 402.

As shown in the cross-sectional view of FIG. 13, in the hydrogen production apparatus 50 related to the present embodiment, the optical fiber 404 is disposed between the lens B: 402 and the photocatalyst 601. In such configuration, as shown in FIG. 14 enlargingly illustrating the portion surrounded by the dotted line I of FIG. 13, the visible light generated by the infrared light conversion unit 401 by the infrared light having transmitted the wavelength separation filter 301 and having entered the infrared light conversion unit 401 enters the lens B: 402, and the visible light having emitted from the lens B: 402 is condensed on the tip portion 403 of the optical fiber 404. The light condensed on the tip portion 403 is emitted to the photocatalyst 601 side from the opposite side end through the optical fiber 404. In fact, the optical fiber 404 is branched in the middle as shown in FIG. 13 and emits the visible light also to the side of the other photocatalyst 601, however, illustration thereof is omitted in FIG. 14.

According to the present embodiment, by employing the configuration of irradiating the visible light to the photocatalyst 601 using the optical fiber 404, an optical path can be set without been affected by a structure between the lens B: 402 and the photocatalyst 601, and the visible light generated by the infrared light conversion unit 401 can be irradiated surely to the photocatalyst 601.

Further, in the present embodiment also, the pipe 701 on the hydrogen gas generation side and the pipe 702 on the oxygen gas generation side can employ such configuration that the pipe 701-1 on the hydrogen gas generation side and the pipe 702-1 on the oxygen gas generation side are connected to each other by the intermediate section 710 and the entirety of the photocatalyst 601 is placed in water as explained in the second embodiment using FIG. 6, or such configuration as shown in FIG. 7 as explained in the modification of the second embodiment.

Also, the ultraviolet light conversion unit 501 may be substituted by such wavelength separation unit (monochromater) 502 as explained in the third embodiment and may be combined to such configuration of forming the wavelength conversion layer 503 in a part of the photocatalyst 601-1 as explained in FIG. 10.

Fifth Embodiment

A fifth embodiment of the present invention will be explained using FIG. 15 and FIG. 16.

Figure 15:
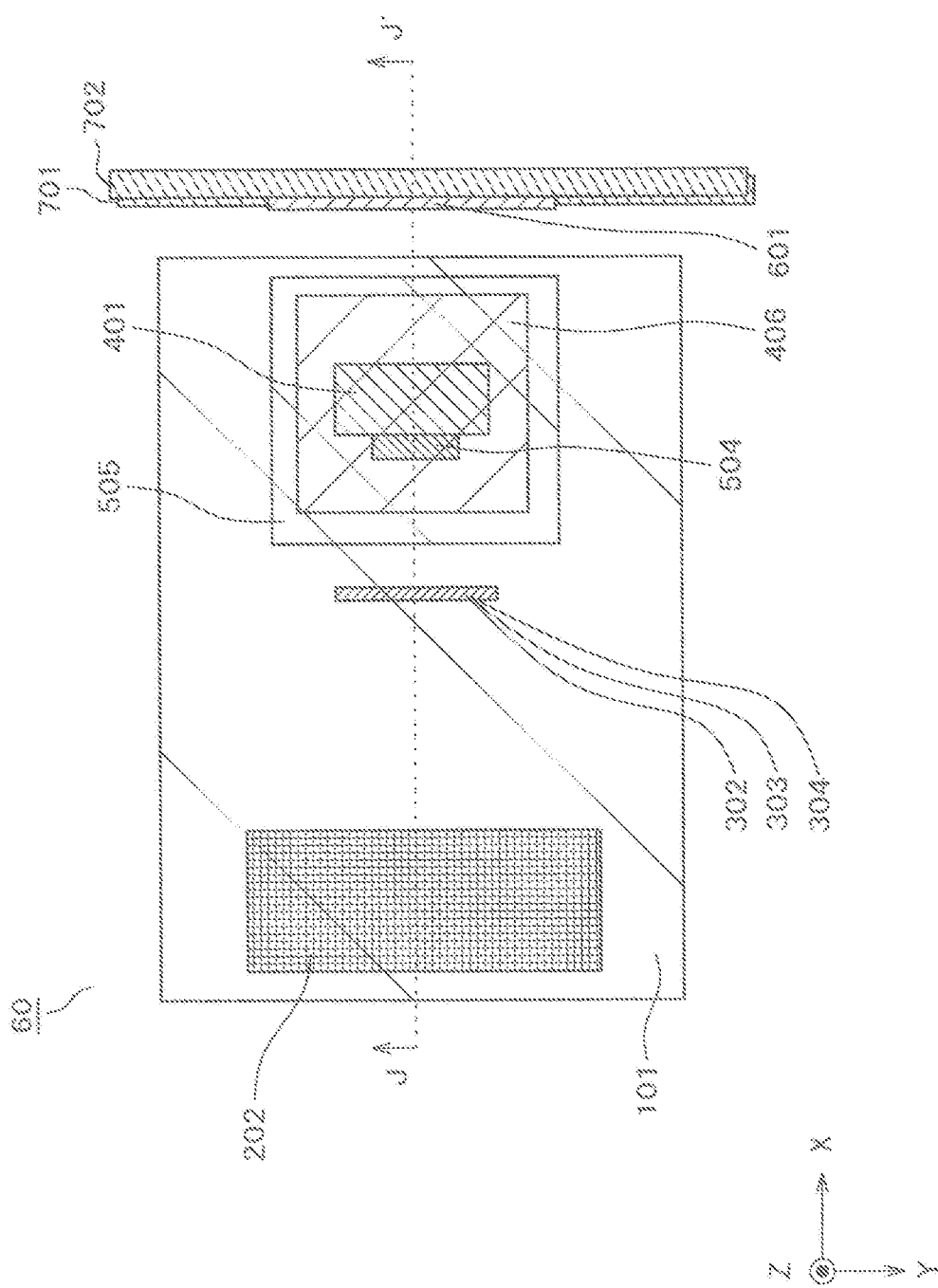
FIG. 15 is a plan view of a hydrogen production apparatus related to a fifth embodiment of the present invention.
Figure 16:
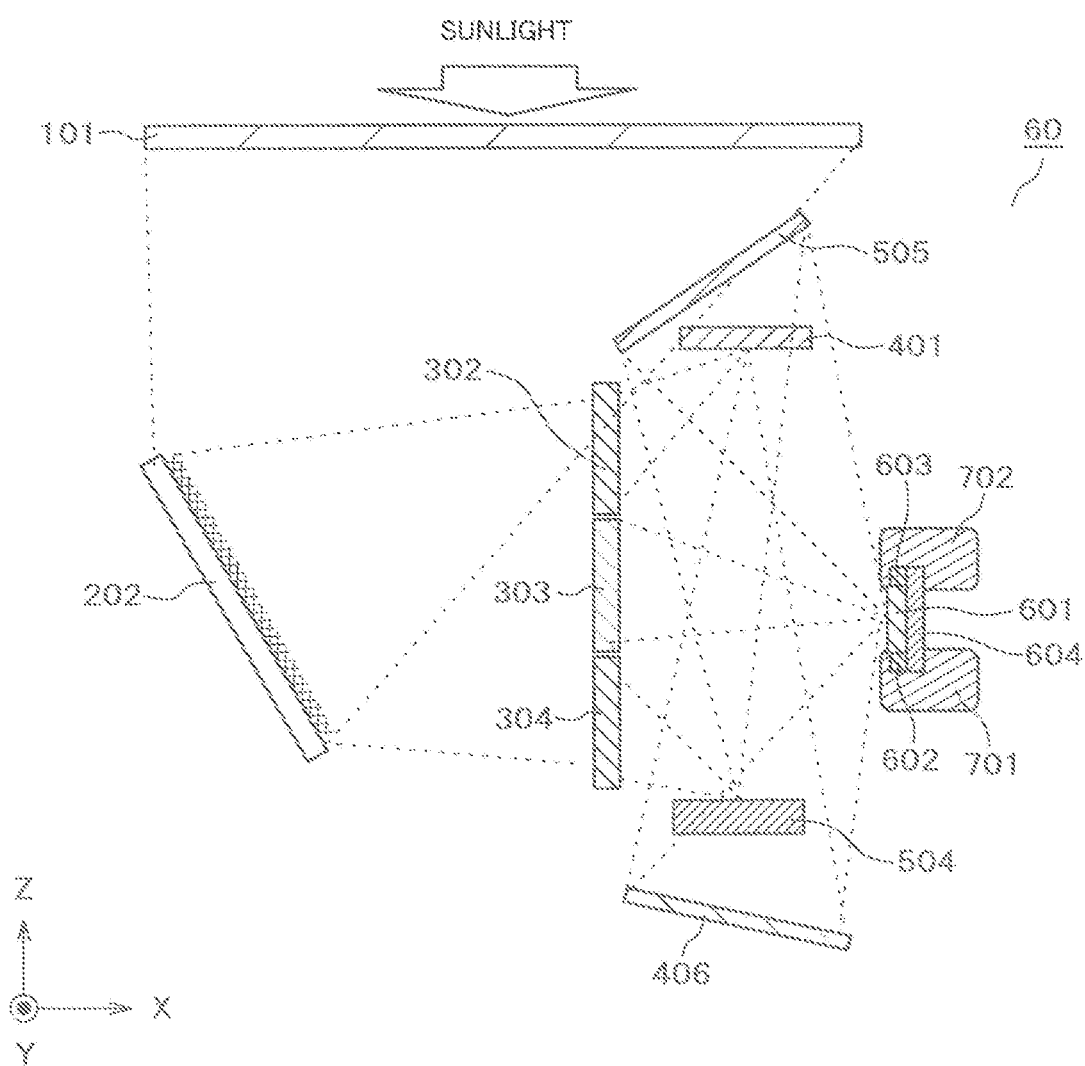
FIG. 16 is a cross-sectional view as seen along the line J-J' of FIG. 15.

FIG. 15 is a plan view of a hydrogen production apparatus 60 related to the present embodiment, and FIG. 16 is a cross-sectional view as seen along the line J-J' in FIG. 15.

The hydrogen production apparatus 60 related to the present embodiment is common with the hydrogen production apparatus 10 explained in the first embodiment in terms of using the lens A: 101, but is different from the hydrogen production apparatus 10 explained in the first embodiment with respect to the route of the light having been emitted from the lens A: 101.

The hydrogen production apparatus 60 related to the present embodiment includes a wavelength separation mechanism (monochromater type) 202, a lens C (infrared light) 302, a lens D (visible light) 303, a lens E (ultraviolet light) 304, the infrared light conversion unit 401, a condensing mirror B: 406, an ultraviolet light conversion unit 504, a condensing mirror D: 505, the photocatalyst 601, the auxiliary catalyst (for hydrogen) 602, the auxiliary catalyst (for oxygen) 603, the substrate 604, the pipe 701 on the hydrogen gas generation side, and the pipe 702 on the oxygen gas generation side.

The pipe 701 on the hydrogen gas generation side and the pipe 702 on the oxygen gas generation side are connected to the water/gas separation mechanism unit 703 and the hydrogen gas and the oxygen gas are taken out in as similar manner to the hydrogen production apparatus 10 of the first embodiment explained in FIG. 1.

In the configuration shown in FIG. 15 and FIG. 16, the sunlight having entered the lens A: 101 is condensed on and irradiated to the wavelength separation mechanism 202. The sunlight having been condensed on and irradiated to the wavelength separation mechanism 202 is emitted by the wavelength separation mechanism 202 at an angle according to the wavelength. In the configuration shown in FIG. 16, the infrared light having a long wavelength is emitted to the direction of the lens C (infrared light) 302, the visible light is emitted to the direction of the lens D (visible light) 303, and the ultraviolet light is emitted to the direction of the lens E (ultraviolet light) 304.

The infrared light having entered the lens C (infrared light) 302 is emitted and converged to the direction of the infrared light conversion unit 401, and enters the infrared light conversion unit 401. Visible light is generated from the infrared light conversion unit 401 by entering of the infrared light, and the generated visible light is emitted to the direction of the condensing mirror B: 406, and is condensed on and irradiated to the surface of the photocatalyst 601 by the condensing mirror B: 406.

The visible light having entered the lens D (visible light) 303 is emitted and converged to the direction of the photocatalyst 601, and enters the photocatalyst 601.

The ultraviolet light having entered the lens E (ultraviolet light) 304 is emitted and converged to the direction of the ultraviolet light conversion unit 504, and enters the ultraviolet light conversion unit 504. Visible light is generated from the ultraviolet light conversion unit 504 by entering of the ultraviolet light, and the generated visible light is emitted to the direction of the condensing mirror D: 505, and is condensed on and irradiated to the surface of the photocatalyst 601 by the condensing mirror D: 505.

In the photocatalyst 601 and the auxiliary catalyst (for hydrogen) 602 and the auxiliary catalyst (for oxygen) 603 where the visible light has entered, the auxiliary catalyst (for hydrogen) 602 and the auxiliary catalyst (for oxygen) 603 being formed at both ends of the photocatalyst 601, water is decomposed and a hydrogen gas is generated inside of the pipe 701 on the hydrogen gas generation side, and water is decomposed and an oxygen gas is generated inside of the pipe 702 on the oxygen gas generation side.

The hydrogen gas generated inside of the pipe 701 on the hydrogen gas generation side flows along with water, the hydrogen gas is separated from the water in the water/gas separation mechanism unit 703 explained in the first embodiment using FIG. 1, and the hydrogen gas is recovered. On the other hand, the oxygen gas generated inside of the pipe 702 on the oxygen gas generation side flows along with water, the oxygen gas is separated from the water in the water/gas separation mechanism unit 703, and the oxygen gas is recovered.

According to the present embodiment, the utilization efficiency of the sunlight in the hydrogen production apparatus 10 can be improved by converting the infrared light and the ultraviolet light to the visible light out of the sunlight entering the hydrogen production apparatus 10 and using respective components which are not capable of activating the photocatalyst as it is and not contributing to generation of a hydrogen gas.

Further, in the present embodiment also, the pipe 701 on the hydrogen gas generation side and the pipe 702 on the oxygen gas generation side can employ such configuration that the pipe 701-1 on the hydrogen gas generation side and the pipe 702-1 on the oxygen gas generation side are connected to each other by the intermediate section 710 and the entirety of the photocatalyst 601 is placed in water as explained in the second embodiment using FIG. 6, or such configuration as shown in FIG. 7 as explained in the modification of the second embodiment.

Also, the ultraviolet light conversion unit 504 may be substituted by such wavelength separation unit (monochromater) 502 as explained in the third embodiment, the ultraviolet light is condensed on and irradiated to the region where the ultraviolet light-sensitive photocatalyst having sensitivity to the ultraviolet light is coated on the surface of the photocatalyst 601 by the condensing mirror D: 505, and such configuration of forming the wavelength conversion layer 503 in a part of the photocatalyst 601-1 as explained in FIG. 10 may be combined.

Also, such configuration similar to one explained in the first modification of the third embodiment is also possible that a reflecting mirror reflecting the ultraviolet light is used instead of the ultraviolet light conversion unit 504, and the ultraviolet light is condensed on and irradiated to the region where the ultraviolet light-sensitive photocatalyst having sensitivity to the ultraviolet light is coated on the surface of the photocatalyst 601 by the condensing mirror D: 505.

Further, although an example of allowing water to flow through the inside of the pipe 701 or 701-1 on the hydrogen gas generation side and the pipe 702 or 702-1 on the oxygen gas generation side to generate a hydrogen gas and an oxygen gas has been explained in the embodiments described above, it is also possible to allow a mixed liquid of ammonia ($NH_3$) and water instead of water. When such mixed liquid is used, a hydrogen gas and a nitrogen gas can be separated and recovered in the water/gas separation mechanism unit 703.

Also, by allowing a mixed liquid of water and carbon dioxide to flow instead of water, a hydrogen gas is recovered and formic acid can be recovered as liquid in the water/gas separation mechanism unit 703.

Although the invention achieved by the present inventor has been explained above specifically based on the embodiments, it is needles to mention that the present invention is not to be limited to the embodiments described above and can be changed variously within a range not departing from the gist of the present invention. For example, the embodiments described above have been explained in detail for the purpose of easy understanding of the present invention, and they are not necessarily limited to those including all configurations having been explained. Also, with respect to a part of the configuration of each embodiment, it is possible to effect addition, deletion, and substitution of other configurations.

REFERENCE SIGNS LIST 10, 20, 30, 40, 50, 60 . . . Hydrogen production apparatus
101 . . . Lens A
201 . . . Reflecting mirror
202 . . . Wavelength separation mechanism
301 . . . Wavelength separation filter
302 . . . Lens C (infrared light)
303 . . . Lens D (visible light)
304 . . . Lens E (ultraviolet light)
401 . . . Infrared light conversion unit
402 . . . Lens B
404 . . . Optical fiber
406 . . . Condensing mirror B
501, 504 . . . Ultraviolet light conversion unit
502 . . . Wavelength separation unit (monochromater)
503 . . . Wavelength conversion layer
505 . . . Condensing mirror D
601 . . . Photocatalyst
602 . . . Auxiliary catalyst (for hydrogen)
603 . . . Auxiliary catalyst (for oxygen)
701, 701-1 . . . Pipe on the hydrogen gas generation side
702, 702-1 . . . Pipe on the oxygen gas generation side
703 . . . Water/gas separation mechanism unit
710 . . . Intermediate section

What is claimed is:

1. A hydrogen production apparatus including a photocatalyst and generating hydrogen from water, the hydrogen production apparatus comprising:
   a wavelength separation unit separating sunlight by wavelength;
   an infrared light conversion unit converting infrared light separated by the wavelength separation unit to visible light, wherein the visible light is incident upon the photocatalyst; and
   an ultraviolet light conversion unit converting ultraviolet light separated by the wavelength separation unit to visible light, wherein the visible light is incident upon the photocatalyst,
   wherein visible light separated from sunlight by the wavelength separation unit is incident upon the photocatalyst.

2. The hydrogen production apparatus according to claim 1, wherein the wavelength separation unit transmits infrared light out of the sunlight and reflects visible light and ultraviolet light.

3. The hydrogen production apparatus according to claim 2, wherein the ultraviolet light conversion unit reflects the visible light, converts the ultraviolet light to visible light by wavelength, and emits the visible light out of the visible light and the ultraviolet light reflected by the wavelength separation unit.

4. The hydrogen production apparatus according to claim 2, wherein the ultraviolet light conversion unit separates wavelength of the visible light and the ultraviolet light reflected by the wavelength separation unit and emits the visible light and the ultraviolet light.

5. The hydrogen production apparatus according to claim 1, wherein the wavelength separation unit separates wavelength of the sunlight to infrared light, visible light, and ultraviolet light.

6. A hydrogen production apparatus, comprising:
a photocatalyst generating a hydrogen gas from water by irradiating light;
a pipe allowing water to flow through the inside;
a wavelength separation unit separating sunlight by wavelength;
a first optical system condensing on and irradiating to the photocatalyst visible light obtained by separating sunlight by wavelength using the wavelength separation unit;
a second optical system converting ultraviolet light obtained by separating sunlight by wavelength using the wavelength separation unit to visible light and condensing on and irradiating the visible light to the photocatalyst; and
a third optical system converting infrared light obtained by separating sunlight by wavelength using the wavelength separation unit to visible light and condensing on and irradiating the visible light to the photocatalyst.

7. The hydrogen production apparatus according to claim 6, further comprising:
a first pipe allowing water to flow in the inside; and
a second pipe allowing water to flow in the inside,
wherein an auxiliary catalyst for hydrogen gas is formed in a part of the photocatalyst,
an auxiliary catalyst for oxygen gas is formed in another part of the photocatalyst,
the photocatalyst on a side of forming the auxiliary catalyst for hydrogen gas is disposed inside the first pipe, and
the photocatalyst on a side of forming the auxiliary catalyst for oxygen gas is disposed inside the second pipe.

8. The hydrogen production apparatus according to claim 6, wherein the photocatalyst is disposed inside the pipe.

9. The hydrogen production apparatus according to claim 8,
wherein an auxiliary catalyst for hydrogen gas is formed in a part of the photocatalyst disposed inside the pipe, and
an auxiliary catalyst for oxygen gas is formed in another part of the photocatalyst.

10. The hydrogen production apparatus according to claim 8,
wherein an auxiliary catalyst for hydrogen gas is formed in a part of the photocatalyst disposed inside the pipe,
an opposite electrode is disposed at a position inside the pipe and apart from the photocatalyst, and
the photocatalyst and the opposite electrode are separated from each other inside the pipe by an ion-exchanging membrane.

11. A hydrogen production apparatus, comprising:
a photocatalyst generating a hydrogen gas in water by irradiating visible light;
a light irradiation unit irradiating visible light originating from a sun and visible light generated from light other than the visible light of the sunlight to the photocatalyst; and
a water/gas separation mechanism unit separating a hydrogen gas from the water, the hydrogen gas being generated by the photocatalyst, the visible light included in the sunlight and the generated visible light being irradiated to the photocatalyst from the light irradiation unit,
wherein the light irradiation unit includes:
a first optical system condensing on and irradiating to the photocatalyst visible light obtained by separating the sunlight by wavelength using a wavelength separation unit;
a second optical system converting ultraviolet light to visible light using an ultraviolet light conversion unit and condensing on and irradiating the visible light to the photocatalyst, the ultraviolet light being obtained by separating the sunlight by wavelength using the wavelength separation unit; and
a third optical system converting infrared light to visible light using an infrared light conversion unit and condensing on and irradiating the visible light to the photocatalyst, the infrared light being obtained by separating the sunlight by wavelength using the wavelength separation unit.

12. The hydrogen production apparatus according to claim 11, further comprising:
a first pipe allowing water to flow in the inside; and
a second pipe allowing water to flow in the inside,
wherein an auxiliary catalyst for hydrogen gas is formed in a part of the photocatalyst,
an auxiliary catalyst for oxygen gas is formed in another part of the photocatalyst,
the photocatalyst on a side of forming the auxiliary catalyst for hydrogen gas is disposed inside the first pipe, and
the photocatalyst on a side of forming the auxiliary catalyst for oxygen gas is disposed inside the second pipe.

13. The hydrogen production apparatus according to claim 11, further comprising a pipe allowing water to flow through the inside,
wherein the photocatalyst is disposed inside the pipe,
an auxiliary catalyst for hydrogen gas is formed in a part of the photocatalyst disposed inside the pipe, and
an auxiliary catalyst for oxygen gas is formed in another part of the photocatalyst.

14. The hydrogen production apparatus according to claim 11, further comprising a pipe allowing water to flow through the inside,
wherein the photocatalyst is disposed inside the pipe,
an auxiliary catalyst for hydrogen gas is formed in a part of the photocatalyst disposed inside the pipe,
an opposite electrode is disposed at a position inside the pipe and apart from the photocatalyst, and
the photocatalyst and the opposite electrode are separated from each other by an ion-exchanging membrane in the inside of the pipe.

\* \* \* \* \*